United States Patent [19]

Hjortsberg et al.

[11] 4,329,569

[45] May 11, 1982

[54] RESILIENT SNAP-ON ELECTRIC HEATING JACKET FOR TUBULAR OBJECTS

[75] Inventors: Bengt Hjortsberg; Tommy Fredriksson, both of Hallstahammar, Sweden

[73] Assignee: Bulten-Kanthal AB, Hallstahammar, Sweden

[21] Appl. No.: 145,634

[22] Filed: May 1, 1980

[30] Foreign Application Priority Data

May 16, 1979 [SE] Sweden ............................... 7904310

[51] Int. Cl.[3] ........................ H05B 3/36; F16L 53/00; F03B 7/12

[52] U.S. Cl. ...................................... 219/535; 138/33; 219/301; 219/311; 219/528; 219/543; 219/549; 338/212

[58] Field of Search ............... 219/301, 311, 528, 535, 219/543, 544, 548, 549, 345; 138/33; 425/547, 549; 338/212

[56] References Cited

U.S. PATENT DOCUMENTS

| | | | |
|---|---|---|---|
| 1,992,593 | 2/1935 | Whitney | 219/535 X |
| 2,961,522 | 11/1960 | Hammer | 219/543 X |
| 3,125,657 | 3/1964 | Colten | 219/528 |
| 3,194,868 | 7/1965 | Shaw | 425/547 |
| 3,214,565 | 10/1965 | Hager et al. | 219/549 |
| 3,597,591 | 8/1971 | van Derlip | 219/535 X |
| 3,632,260 | 1/1972 | Moslo | 425/549 |
| 3,757,087 | 9/1973 | Bernard | 219/543 X |
| 3,904,850 | 9/1975 | Johnson | 219/528 |
| 3,968,348 | 7/1976 | Stanfield | 219/535 |
| 4,060,710 | 11/1977 | Reuter | 219/548 |
| 4,281,238 | 7/1981 | Noma et al. | 219/535 |

*Primary Examiner*—A. Bartis

*Attorney, Agent, or Firm*—Pollock, Vande Sande & Priddy

[57] ABSTRACT

A resilient snap-on electric heating jacket for heating tubular objects includes a thin sheet of flexible plastic material constituting a radially internal curved surface adapted to engage the surface of the object. A pattern of spaced electrically conductive loops are formed on the radially external surface of the sheet to define an electric heating element. A thick resilient support member of polymeric material coextensive with and overlying the external surface of the plastic sheet and the foil loops is directly secured to the external surface portions of the foil loops and the plastic sheet by an autogenous bond to form a unitary structure generally C-shaped in cross section and capable of being snapped onto a tubular object the outer diameter of which corresponds approximately to the inner diameter of the profile of the unitary structure. The profile of the support member encloses an angle between 180° and 270° and preferably between 200° and 250°.

3 Claims, 2 Drawing Figures

RESILIENT SNAP-ON ELECTRIC HEATING JACKET FOR TUBULAR OBJECTS

BACKGROUND OF THE INVENTION

The invention relates to an electrical element, such as a sensing or heating element, comprising a support member and a foil element mounted thereon and having electrically conductive loops.

Electrical heating foil elements have been widely used in recent years. Such foil elements are normally produced by etching a metal foil, and the resulting, usually meander-like metal strip is protected between two thin plastic foils, which secure electrical insulation and permit the handling thereof as a unitary element. The foil element can be embedded in a structural element or mounted on a part so as to serve as a heating or sensing means.

Normally, the foil element is mounted on the support member by means of special fastening means or an adhesive. However, the mounting operation may require much work and might therefore by rather costly, especially if the foil element is to be secured to a curved surface. It has proven particularly difficult to adhesively mount the foil element on the inside of a tubular element of plastic material.

SUMMARY OF THE INVENTION

The object of the invention is to achieve a simplified method of fixing an electrical foil element on a support member, and this object is accomplished by injection molding the support member directly against the electrically conductive loops of the foil element, these loops being protected on one side by a thin plastic foil, and on the other side brought to adhere to and be isolated by the support member.

The invention also concerns an electrical element produced in the above described manner, the loops being protected on one side by a thin plastic foil, whereas they on their other side they adhere to and are kept isolated by the support member formed by injection molding directly thereto.

BRIEF DESCRIPTION OF THE DRAWING

The invention will now be described with reference to the drawing, in which.

DETAILED DESCRIPTION OF A PREFERRED EMBODIMENT

Figure 1:
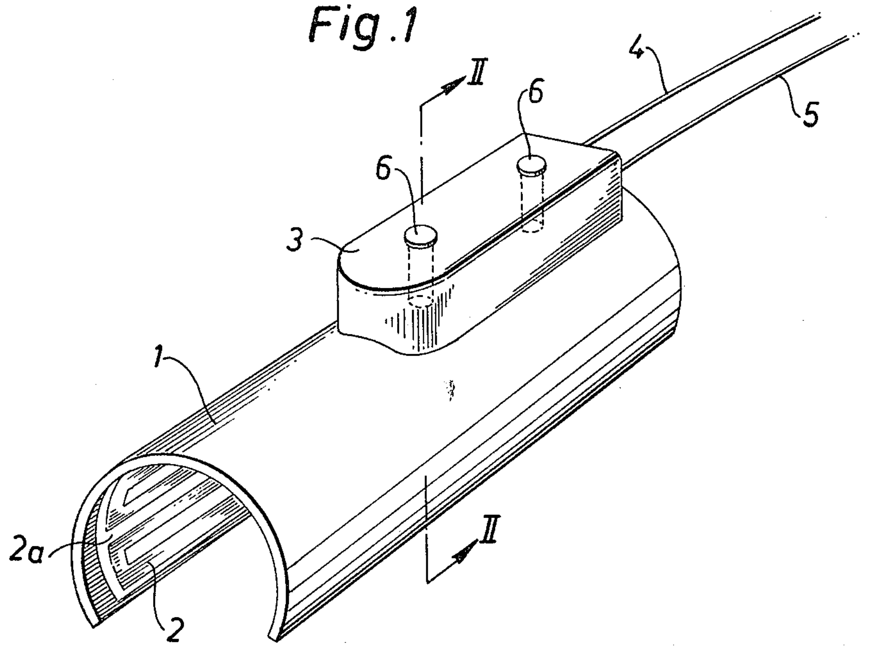
FIG. 1 shows a tubular electrical element according to the invention in perspective.
Figure 2:
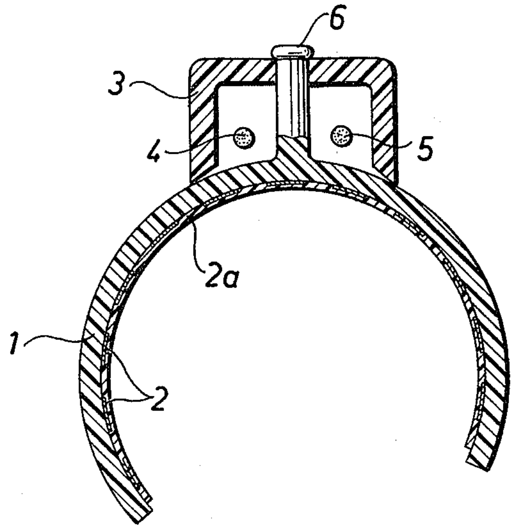
FIG. 2 shows a section of the element along line 2—2 of FIG. 1.

The illustrated electrical element comprises a part-cylindrical support member 1 with an internally mounted foil element consisting of electrically conductive, meander-shaped loops 2 and a thin, radially internally protecting plastic foil *2a*. The part-cylindrical support member 1 encloses circumferentially an angle between 180° and 270°, preferably between 200° and 250°, and can thus be snapped onto a tube or the like, the outer diameter of which is approximately the same as the inner diameter of the support member. By conducting an electrical current through the meander loops, an effective heat transfer to the tube can be achieved, e.g., for heating a fluid flowing therein or for defrosting purposes.

At the top, an external box-like casing 3 is mounted on the support member 1, said casing enclosing feed conductors 4,5 for the electrical circuit and possible fuses and thermostatic devices (not shown).

The casing 3 is secured to the support member 1 by fitting the same onto two radially projecting lugs 6 which are formed unitarily with the support member 1 and the heads of which have been deformed, possibly while applying heat, so as to retain the casing.

According to the invention, the support member 1, consisting of polymeric material, is formed, in particular by injection molding, directly against the foil element *2a*. For this purpose, the foil element *2a*, consisting of only one plastic foil and an etched metal foil circuit, is placed in the mold chamber of an injection molding machine, whereupon the material to be moulded so as to constitute the support member 1 is injected into the moulding chamber and is thereby applied into direct contact with the electrical circuit loops. During the hardening of the molding mass, effective adhesion is obtained without use of any special adhesive agent. Nor is any special device for holding the foil element *2a* required, as is the case when glueing. Polyamide, possibly reinforced with very small glass balls, can preferably be used as support member material in the injection molding process.

Depending on the selected support member material, other forming methods may be used as well, e.g., compression moulding, transfer molding, or hot forming. The essential feature is that the adhesion between the support member and the foil element be accomplished during the solidifying, curing or hardening of the support member material.

Of course, the shape of the support member may be adapted at will within the scope of the inventive idea. When forming the support element, projections and recesses can be produced without difficulty. Moreover, the lugs 6 mentioned above can preferably be constituted by sprue portions.

The inventive method has turned out to be especially advantageous for tubular elements, and possible applications are the heating of illumination tubes (e.g., in copying machines) or other tubular objects, such as water pipes, handles, heating enclosures, etc.

We claim:

1. An electrical element including a curved surface portion, comprising (a) a thin sheet of flexible plastic material constituting the radially internal surface layer of said curved surface portion;

(b) a pattern of electrically conductive spaced foil loops formed on the radially external surface of said thin plastic sheet, so as to define an electrical heating element; and (c) a thick resilient support member of polymeric material at least coextensive with and overlying the radially external surface of said thin plastic sheet and said foil loops;

(d) said support member being directly secured to the external surface portions of said foil loops and said thin plastic sheet between said foil loops by an autogenous bond to form a resilient unitary structure generally C-shaped in cross section, capable of being snapped onto a tube the outer diameter of which approximately corresponds to the inner diameter of the profile of said unitary structure; and (e) said foil loops being protectively sandwiched between said thin plastic sheet and said support member.

2. An electrical element according to claim 1, wherein the profile of said support member encloses an angle between 180° and 270°.

3. An electrical element according to claim 2, wherein the profile of said tubular support member encloses an angle between 200° and 250°.

* * * * *